United States Patent Office 3,634,468
Patented Jan. 11, 1972

3,634,468
3-CYCLOPENTYLOXY - 13-POLYCARBONALKYL-17α - ETHYNYLGONA-3,5-DIEN-17β-OLS AND 17-ACYLATES
Reinhardt P. Stein, Conshohocken, and Herchel Smith, Bryn Mawr, Pa., assignors to American Home Products Corporation, New York, N.Y.
No Drawing. Continuation-in-part of application Ser. No. 818,126, Apr. 21, 1969, which is a continuation-in-part of application Ser. No. 767,809, Oct. 15, 1968. This application Aug. 22, 1969, Ser. No. 852,455
Int. Cl. C07c *169/20*
U.S. Cl. 260—397.5          13 Claims

ABSTRACT OF THE DISCLOSURE

Novel 3 - cyclopentyloxy - 13 - polycarbonalkyl-17α-ethynylgona-3,5-dien-17β-ols and 17-acylates, optionally substituted at $C_6$, $C_7$, $C_{10}$ and $C_{16}$ with methyl groups (I) are hormonally active as progestational agents with long duration of activity after oral administration. 17-acylated compounds (I) are provided by enolacylating and acylating, in one step, the corresponding 13-alkyl-17α-ethynylgon-4-en-3-on-17β-ol either with a reagent comprising acetic anhydride and aqueous perchloric acid in a non-polar, inert organic solvent, preferably ethyl acetate, or an anhydride in admixture with an acyl halide and an acid acceptor, and then carrying out an exchange reaction between the 3-enol acylate-17-acylate formed thereby and cyclopentyl alcohol; and the 17-ols are provided by ethynylating the corresponding 17-ones. In contrast to the prior art procedure which requires blocking the 3-keto group and prolonged reaction times, enol acetylation with acetic anhydride and aqueous perchloric acid can be completed in five minutes at room temperature.

---

This application is a continuation-in-part of copending application Ser. No. 818,126, filed Apr. 21, 1969, which in turn is a continuation-in-part of copending application Ser. No. 767,809, filed Oct. 15, 1968, both of which are abandoned.

This invention relates to novel steroid compounds having pharmacological activity and utility as intermediates in the preparation of steroid compounds having pharmacological activity and to processes for their preparation. More particularly, the invention contemplates 3-cyclopentyloxy - 13-polycarbonalkyl-17α-ethynylgona-3,5-dien-17β-ols and 17-acylates of Formula I:

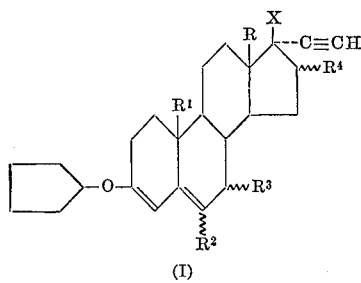

(I)

wherein R is alkyl of from 2 to about 20 carbon atoms; $R^1$, $R^2$, $R^3$ and $R^4$ are hydrogen or methyl; and X is OH or $OCOR^5$ wherein $R^5$ is alkyl of from about 1 to about 10 carbon atoms, cycloalkyl of from about 3 to about 6 carbon atoms or monocarbocyclic aryl(lower)alkyl.

Also contemplated are particularly valuable species within the scope of Formula I. These are, respectively:

*dl* - 3 - cyclopentyloxy-13-ethyl-17α-ethynylgona-3,5-dien-17β-ol and its 17-acetate, i.e., compounds of Formula I wherein R is ethyl, $R^1$, $R^2$, $R^3$ and $R^4$ are hydrogen and X is OH or $OCOCH_3$;

*d* - 3 - cyclopentyloxy - 13-ethyl-17α-ethynlgona-3,5-dien-17β-ol, 17-acetate, i.e., a compound of Formula I wherein R is ethyl, $R^1$, $R^2$, $R^3$ and $R^4$ are hydrogen and X is $OCOCH_3$, in the form of a *d*-enantiomorph, substantially free of the corresponding *l*-enantiomorph; and 3 - cyclopentyloxy - 13 - ethyl - 17α - ethynylgona-3,5-dien-17β-ol, heptanoate.

The compounds of Formula I are useful per se, in that they possess hormonal effects in animals as evidenced by standard pharmacological tests, including progestional effects of long duration of activity after oral administration. In contrast to compounds of the prior art, the instant compounds have a substantially increased duration of activity. Especially valuable for this purpose are *dl* - 3 - cyclopentyloxy - 13 - ethyl - 17α-ethynylgona-3,5 - dien-17β-ol, *dl*- and *d*-3-cyclopentyloxy-13-ethyl-17β-ethynylgona-3,5-dien-17β-ol, 17-acetate, i.e., respectively, a compound of Formula I wherein R is ethyl and X is OH and one wherein X is $OCOCH_3$ in its racemic and its *d*-enantiomorphic form. Furthermore, compounds of Formula I are of value as intermediates for the preparation of compounds exhibiting hormonal effects in animals by standard pharmacological tests.

The instant compounds of Formula I are provided by a novel process contemplated by this invention. This is, in essence: a process for the preparation of a 3-cyclopentyloxy - 13-alkyl-17α-ethynylgona-3,5-dien-17β-ol, or 17-acylate compound of the formula:

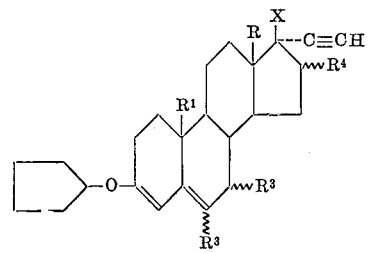

wherein
R is alkyl of from 2 to about 20 carbon atoms,
$R^1$, $R^2$, $R^3$ and $R^4$ are hydrogen or methyl; and
X is OH or $OCOR^5$ wherein $R^5$ is alkyl of from about 1 to about 10 carbon atoms, cycloalkyl of from about 3 to about 6 carbon atoms or monocarbocyclic aryl-(lower)alkyl which comprises:

(I) treating a 17-hydroxygon-4-ene compound of the formula:

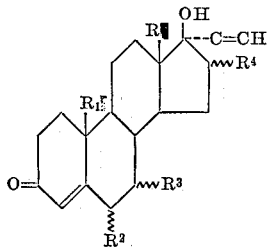

wherein R, R¹, R², R³ and R⁴ are as hereinabove defined, with either (a) Acetic anhydride and aqueous perchloric acid in a substantially non-polar, inert organic solvent until formation of a 3-enol acetate-17-acetate of the formula:

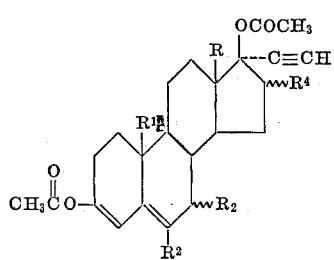

wherein R, R¹, R², R³ and R⁴ are as hereinabove defined, is substantially complete; or (b) an anhydride of the formula $(R^5CO)_2O$ wherein R⁵ is as hereinabove defined in admixture with an acyl halide of the formula $R^5CO-X'$ wherein R⁵ is as hereinabove defined and X' is chloro or bromo and an acid acceptor at a temperature of from about 50° C. to about 150° C. until formation of a 3-enol acylate-17-acylate of the formula:

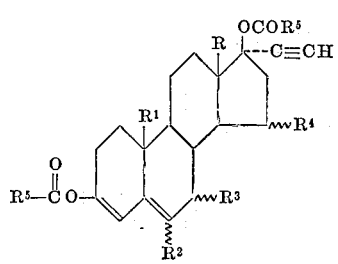

wherein R, R¹, R², R³, R⁴ and R⁵ are as hereinabove defined, is substantially complete; and (II) Treating the products of either step I(a) or step I(b) with cyclopentyl alcohol in the presence of an acid catalyst until formation of the corresponding 3-cyclopentyloxy-13-alkyl-17α-ethynylgona-3,5-dien-17β-ol, acylate is substantially complete; or (III) Treating a 3-cyclopentyloxy - 13 - alkylgona-3,5-dien-17-one compound of the formula

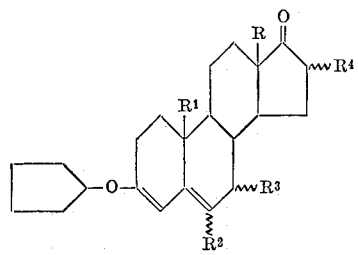

wherein R, R¹, R², R³, and R⁴ are as hereinabove defined, with an ethynylating agent until formation of the corresponding 3-cyclopentyloxy-13-alkyl-17α-ethynylgona-3,5-dien-17β-ol is substantially complete.

As embodiments, there are contemplated:

A process as first above defined wherein step I(a) is carried out at a temperature of from about 15° C. to about 40° C. for about 3 to about 15 minutes;

A process as first above defined wherein step II is carried out at a temperature of from about 65° C. to about 175° C. for from about 5 to about 48 hours;

A process as first above defined wherein said substantially non-polar, inert organic solvent is (lower)alkyl (lower)alkanoate;

A process as first above defined wherein said acid catalyst is p-toluenesulfonic acid;

A process as first above defined wherein step III is carried out with acetylene and lithium acetylide-ethylene diamine in dimethyl sulfoxide; and A process as first above defined wherein R is ethyl, R¹, R², R³, and R⁴ are hydrogen and X is OH or OCOR⁵ wherein R⁵ is $CH_3$ or $CH_2(CH_2)_4CH_3$.

Heretofore it has been proposed to provide 3-cyclopentyl enol ether compounds similar to those of Formula I by a multi-step process comprising, for example, blocking the 3-keto group in the corresponding 17α-ethynylgon-4-ene-3-on-17β-ol, such as by reaction with a ketalizing agent, e.g., ethylene glycol, propylene glycol and the like; conversion of the resulting 3-alkylene ketal to the corresponding 3-enol ester of the 17-ester with an excess of an alkanoic anhydride, it being required first to hydrolyze the ketal group and then to enolesterify the resulting 3-oxo group and simultaneously to esterify the 17-hydroxy group; and finally to exchange the 3-enol ester group for the desired 3-cyclopentyloxy group. A means has now surprisingly been found to accomplish the same conversion in few steps, in a much shorter overall time, while avoiding the need to use the preventive steps of protecting the 3-keto group (e.g., by ketalization) then removing the protective group (e.g., by hydrolysis) which is required in the prior art methods. This means is embodied in Step I(a) of the process first above outlined. In essence there has now been found a combination of reagents and reaction conditions which in this step in only a few minutes will simultaneously esterify the hydroxy group of the 17-position and enolesterify the 3-keto group, avoiding entirely any need to use an exchange reaction between a protecting group (e.g., a ketal radical) and the residue of the employed acid (e.g., acetic acid). The prior art exchange reaction requires a minimum of five hours plus additional time to complete precipitation of the crystalline diacetate.

The 17-acylate compounds of this invention are also provided by the general methods for steroid 3-enol ether preparation known to the art, for instance in which a compound of the formula

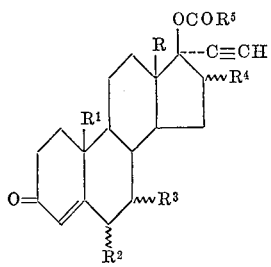

wherein R, $R^1$, $R^2$, $R^3$, $R^4$ and $R^5$ are as hereinabove defined or a protected 3-ketone derivative of it such as an enol ester, enol ether, enol thio ester, enol thio ether, enamine, ketal, hemithioketal or thioketal is reacted with cyclopentyl alcohol or a reactive derivative thereof such as an orthoformate or a ketal, if desired in the presence of a ketal or alkylorthoformate, in the presence of an acid catalyst; or is reacted with a cyclopentylhalide in the presence of a basic catalyst; or a dicyclopentyl ketal of the hereinabove defined ketone is heated. For general methods of the prior art reference is made to Fieser and Fieser, Steroids, 1959, pages 310 to 312, and references listed therein; and to Djerassi, Steroid Reactions, 1963, pages 42 to 46 and references cited therein.

The term "(lower)alkyl" as used herein includes alkyl groups, straight and branched chain and alicyclic of from about 1 to about 6 carbon atoms, illustrative members of which are methyl, ethyl, n-propyl, i-propyl, n-butyl, t-butyl, n-pentyl, 2-methylpentyl, n-hexyl, cyclopentyl, and the like. "Alkyl groups of from about 1 to about 10 carbon atoms" includes "(lower)alkyl groups" as above defined and, in addition, groups such as n-octyl, n-nonyl, n-decyl, and branched chain isomers thereof. "Alkyl of from 2 to about 20 carbon atoms" includes "(lower)alkyl groups" as above defined but excludes, of course, the methyl group, and in addition includes n-octyl, n-nonyl, n-decyl, n - undecyl, n - tetradecyl, n - octadecyl, n-eicosyl and branched chain isomerst hereof. "Cycloalkyl of from about 3 to 6 carbon atoms" includes cyclopropyl, cyclobutyl, cyclopentyl and cyclohexyl as well as cyclopentylmethyl and cyclopropylethyl. "Monocarbocyclic aryl(lower)alkyl" contemplates (lower)alkyl groups as above defined mono-substituted by phenyl, such as benzyl, phenethyl, α-methylbenzyl and the like. Preferably, with respect to the compounds of Formula I, R is the ethyl group, $R^1$, $R^2$, $R^3$ and $R^4$ are hydrogen and X is OH or $OCOCH_3$. The term "substantially non-polar, inert organic solvent" when used herein and in the appended claims, contemplates a family of diluents for the reaction which excludes solvents which would react with acetic anhydride. For example, water and alcohols would not be useful; the only water acceptable in step I(a) is that inherently present in the aqueous perchloric acid. Illustrative solvents are, for example, hydrocarbons, e.g., hexane, heptane, cyclohexane, benzene, toluene, xylene, and the like; chlorinated hydrocarbons, e.g., methylene chloride, chloroform, carbon tetrachloride and the like; ethers, e.g., diethyl ether, diisopropyl ether, and the like; ketones, e.g., acetone, methyl isopropyl ketone and the like; and esters—especially preferred are (lower)alkyl (lower)alkanoates, such as methyl acetate, ethyl acetate, ethyl n-propionate, i-propyl acetate, n-hexyl acetate, ethyl n-hexanoate, n-hexyl n-hexanoate and the like. The term "acid acceptor" is used in its art-accepted sense to contemplate an acid binding agent suitable to combine with the acid halide, HX, formed by reaction of the acyl halide and a hydroxyl group under esterification conditions of step I(b). These comprise, generally, inorganic and organic bases, preferably of weak to moderate strength, such as alkali metal and alkaline earth metal carbonates or bicarbonates, e.g., sodium bicarbonate, lithium carbonate, magnesium carbonate and the like, or organic amines, such as quinoline, dimethylaniline, triethylamine, pyridine and the like. Especially preferred for use in step I(b) of the process first above defined are organic amines and convenient because it helps the mixture reflux at a preferred temperature and is an especially good solvent, is the tertiary aromatic amine, pyridine. The wavy lines at $C_6$, $C_7$, $C_{10}$ and $C_{16}$ of the formulae herein indicates the contemplation of epimers of either α- or β-configuration when methyl-substituted in these positions. The product of the process will have the same configuration as that of the starting materials.

The 13-alkyl-17α-ethynyl-17β-hydroxygon-4-en-3-ones used as starting materials in the instant process are conveniently prepared by techniques known to those skilled in the art. For example, the corresponding 13-alkyl-3-(lower)alkoxygona-1,3,5(10)-trien-17β-ol can be subjected to Birch reduction and Oppenauer oxidation to produce the corresponding 13-alkyl-3-(lower)alkoxygona-2,5(10)-dien-17-one which, when reacted with alkali metal acetylide or Grignard reagent and then acid hydrolyzed with hydrochloric acid, provides the required gon-4-en-3ones. These precedures are illustrated in detail in H. Smith, Hughes, Douglas, Wendt, Buzby, Edgren, Fisher, Foell, Gadsby, Hartley, Herbst, Jansen, Ledig, McLoughlin, McMenamin, Pattison, Phillips, Rees, Siddall, Siuda, L. Smith, Tokolics and Watson, J. Chem. Soc., 1964, 4472–4492. Means are also available to those skilled in the art, which are suitable to prepare starting materials optionally substituted at C–6, C–7, C–10 and C–16 with methyl groups. For example the 6,13- and 7,13-dialkylgonatriene compounds of United Kingdom Pat. No. 1,103,205 can be converted by the route outlined above to the corresponding C–6 and C–7 methyl-substituted gon-4-en-3-ones. The 10β-methyl-13-alkylgon-4-en-3-ones can be provided by converting the 13-alkylgon-4-one to the 4-hydroxy-5-bromo derivative, oxidizing to the 4-keto-5-bromo derivative, oxidizing to the 4-keto-5-bromo derivative, dehydrobrominating across the 5(10) position, adding hydorgen cyanide at 5(10) to obtain the corresponding 4-keto-10-cyano derivative, ketalizing to protect the 4-keto group, reducing the 10-cyano group to a 10-methyl group, hydrolyzing to remove the protecting ketal group to provide the 10β-methyl-13-alkylgonan-4-one, converting this to its 3-hydroxymethylene derivative, converting this to the 3-oximino derivative, hydrolyzing the oximino group, mesylating the 4-hydroxy group, catalytically hydrogenating the unsaturation at the 4-position and eliminating the 4-mesyloxy group to form the 4-en-3-one conjugated system. These procedures are described in detail in U.S. Ser. No. 551,391, now U.S. Pat. No. 3,452,004 and U.S. Ser. No. 551,317, both filed May 19, 1966. The proper substituents at C–17 are introduced by entirely conventional techniques, such as those outlined in H. Smith et al, cited above, and in the said Ser. No. 551,317. The 16-methyl-13-alkyl-17α-ethynylgon-4-en-3-on-17β-ol starting materials are accessible from the corresponding 13β-alkyl-3-alkoxy-16-methylgona-1,3,5(10), 8-tetraen-17-ones of G. A. Hughes and H. Smith, U.S. 3,391,169 (Example 76 shows the 13-ethyl compound), which are reduced with, for example, sodium borohydride, to the 17β-ols, then treated with alkali metal, e.g., sodium, potassium or lithium in liquid ammonia and excess aniline to form the corresponding 17β-ol, triene, which is converted to the starting material by the route outline above. The 3-cyclopentyloxy-13-alkylgona-3,5-dien-17-one starting materials (for step III) can be obtained by briefly treating the corresponding 13-alkylgon- 4-ene-3,17-diones of U.K. Pat. No. 1,010,054, with acetic anhydried and perchloric acid in ethyl acetate at about 25° C. to obtain the corresponding 3-acetoxy-13-alkylgona-3,5-dien-17-ones, treating these with cyclopentyl alcohol and p-toluenesulfonic acid in refluxing heptane to give the 3-cyclopentylenol ether starting materials. These latter methods will be exemplified in detail hereinafter.

The enolesterification and esterification according to step I(a) in the instant process is accomplished by contacting the 13-alkyl-17α-ethynyl-17β-hydroxygon-4-en-3-one with acetic anhydride and aqueous perchloric acid in a substantially nonpolar, inert organic solvent, e.g., those illustrated above and, preferably, ethyl acetate. The reaction temperature and time are not particularly critical although best results in terms of product purity and yield are obtained at reaction temperatures of from about 15° C. to about 40° C., preferably about 20° C. to 25° C. during reaction times of from about three to about fifteen minutes although, in most instances, about 5 minutes is entirely satisfactory. In one manner of proceeding, to a solution of 4.8 parts by volume of acetic anhydride, 0.05 parts by volume of 70% aqueous perchloric acid and 50 parts by volume of ethyl acetate there is added 1 part by weight of the 13-alkyl-17α-ethynyl-17β-hydroxygon-4-en-3-one. The mixture is allowed to stand at about 25° C. for about 5 minutes. The diacetate is recovered in any standard manner. For example, the reaction mixture can be poured into saturated aqueous sodium bicarbonate solution. The organic layer then is separated, washed with sodium bicarbonate, water, brine and dried over anhydrous sodium sulfate. The mixture is filtered, the solvent is removed by distillation in a vacuum and then methanol and a small amount of pyridine are added. Cooling and removing the solvent in a vacuum leaves the diacetate as a residue, which can be recrystallized if desired from an appropriate solvent, e.g., a lower alkanol such as methanol.

The enolesterification and esterification according to step I(b) in the instant process is accomplished by heating the corresponding anhydride in admixture with the corresponding acyl halide and an acid acceptor, e.g., as illustrated above and, preferably, pyridine, at a temperature of from about 50° C. to about 150° C. until the reaction is substantially complete. The time required is not particularly critical and, in most instances, if steam bath temperatures are used, i.e., about 90° C., the reaction is essentially complete in from about 1 to about 2 hours. In one manner of proceeding, 3 parts by weight of the steroid is mixed with about 16 parts by volume of the anhydride and about 8 parts by volume of the acyl halide, then about 0.8 part of the volume of the acid acceptor is added if, for example, pyridine, is used. The mixture is heated on a steam bath for about 1 to 2 hours. The product is recovered by any of the usual methods. For example, the reaction mixture can be cooled, then mixed with from 5 to 10 volumes of water, then extracted with a water-immiscible organic solvent, such as ether or chloroform, then the solvent is thoroughly dried and evaporated leaving the product as a residue. It is useful to apply a high vacuum to the residue to remove traces of unreacted anhydride and acyl halide. The product can be purified, if desired, by chromatography or by crystallization from an appropriate solvent, for example, a lower alkanol such as methanol.

The exchange reaction between the acyl radical in the 3-position and the cyclopentyl group, step (II) of the process first above defined is accomplished by treating the 3-enol acetate-17-acetate (diacetate) with cyclopentyl alcohol in the presence of an acid catalyst of enoletherification. The reaction conditions are not particularly critical although for best results it is preferred to carry out this step at a temperature of from about 65° C. to about 175° C. for from about 5 to about 48 hours. The acid catalyst required to bring about the exchange reaction can be any of those commonly used to form enol ethers. These would include toluenesulfonic acid, benzenesulfonic acid, naphthalene sulfonic acid, anthraquinone sulfonic acid and Lewis acids such as stannic chloride or antimony pentachloride. Acid salts of organic bases with mineral acids, e.g., pyridinium chloride are also useful in step (II). p-Toluenesulfonic acid is convenient, economical and preferred. The exchange reaction of step (II) is preferably carried out in an organic solvent which is substantially non-polar. Solvents such as heptane, isooctane, benzene, toluene and the xylenes, tetrahydrofuran or dioxane can be used. Halogenated organic solvents, such as ethylene bromide, chloroform or tetrachloroethane also can be used. Heptane is economical, it refluxes at a desirable temperature and is preferred. In one manner of proceeding, a mixture of 1 part by weight of the 3-enol acetate-17-acetate, 0.05 part by weight of p-toluenesulfonic acid, 2 parts by volume of cyclopentyl alcohol, and 50 parts by volume of heptane is refluxed into a water-separator for 20 hours. The product can be recovered by any of the usual techniques. For example, the reaction mixture can be cooled to about 25° C. and a small amount of pyridine is added before evaporation to dryness in a vacuum. The residue can be dissolved in methanol the solution filtered and then evaporated to dryness to leave the product as a residue. It may be purified, if desired, by recrystallization from a suitable solvent, e.g., a lower alkanol, for example, methanol.

The ethynylation according to step III is accomplished by reacting the 17-keto compound with an ethynylating agent, such as an alkali metal acetylide, e.g., potassium or lithium acetylide or a Grignard reagent. It is useful to carry out the reaction in a diluent, for example, with potassium acetylide, liquid ammonia can be used; and with lithium acetylide, dimethyl sulfoxide can be used, and is preferred. In one manner of proceeding, purified acetylene gas is bubbled through a solution of the cyclopentylenol ether-17-one in about 75 parts by volume of dimethylsulfoxide (DMSO) per part by weight of substrate. After about 45 minutes about one-half part by weight of lithium acetylide-ethylenediamine per part by weight of steroid is added; and the mixture is stirred for two hours. Then a second portion of lithium acetylide-ethylene diamine (weighing the same as the first) is added. After two hours the reaction is substantially complete and the product is recovered by pouring the mixture into ice-water, and the extracting, e.g., with ether, washing, drying and evaporating the extract, which leaves the product as a residue. It can, if desired, be purified by chromatography and by recrystallization.

In the product of total synthesis which has not included a suitable resolution stage the compounds prepared by the invention will be present as racemates. Using a convention approved by Fieser and Fieser, "Steroids," p. 336, (1959), compounds designated as the d-forms are the enantiomers corresponding in configuration at C–13 to that of the natural hormone estrone. The corresponding enantiomorphs are consequently designated the l-forms and the racemates the dl-forms. Racemates will be depicted by structural formulas which show only the enantiomorphs of the d-configuration.

As is mentioned above, the compounds of Formula I provided by this invention possess valuable hormonal activity. More particularly, in pharmacological tests in rabbits they have been found to be orally-active, potent progestational agents with a prolonged duration of activity. This makes them of value to treat conditions in animals, such as valuable domestic animals, for example, cattle, pigs and dogs, which respond to administration of progestational agents, such as the need to control habitual abortion in cattle and to delay estrus in cattle, pigs and dogs. When used for this purpose or for pharmacological purposes, compounds of Formula I will be formulated and administered by techniques and at dosages which have become matters of common knowledge and experience for structurally-some-what-similar progestational agents, e.g., norethindrone and the 3-enol ethers and 3-enol acetates thereof. For example, for progestational deficiencies in a warm blooded animal of 50–100 kg. body weight, a useful regimen would be oral administration of 5–20 mg. daily in the form of a 5 mg. scored tablet, for example, or in admixture with animal feedstuffs.

One pharmacological test in which progestational activity of prolonged duration is demonstrated was carried out as follows: The orally-administered compound is subjected to a Clauberg assay and the progestational effects are determined after 2 days, 5 days and 7 days post- administration. Compounds that maintain biologically meaningful progestational effects for at least several days are deemed to have a prolonged duration of activity. Immature female rabbits (800–1200 g.) are primed with estradiol-17β for 6 days. On the following day the primed rabbits then receive one administration of the test compound by stomach tube (gavage). The animals are sacrificed at 2, 5 and 7 days post-treatment. Progresational activity is assayed by histological evaluation of uterine glandular proliferation [Elton and Edgren, Endocrinology, 63, 464–472 (1958)]. In this test, dl-3-cyclopentyloxy-13-ethyl-17α-ethynylgona-3,5-diene-17β-ol, acetate, a compound of this invention administered at 1 mg. per animal had an assay value (McPhail Index) of 1.8 after 2 days; and 1.2 after 5 days (4 animals); and at 3 mg. per animal it had an assay value of 1.5 after 2 days; and 1.2 after 5 days (3 animals); and at 10 mg. per animal had an assay value of 1.2 after 2 days (3 animals); 2.9 after 5 days (4 animals); and 2.0 after 7 days (4 animals); showing that it maintained biologically meansingful progestational effects even 1 week after a single oral administration of 10 mg. per animals.

DESCRIPTION OF THE PREFERRED EMBODIMENTS

The following examples describe processes of the instant invention. They are given for the purpose of illustrating the invention, but are not to be construed to limit it in any manner whatsoever.

EXAMPLE 1 dl-3-cyclopentyloxy-13-ethyl-17α-ethynylgona-3,5-dien-17a-ol, acetate (a) dl-13-ethyl - 17α - ethynylgona-3,5-dien-3,17β-diol, diacetate.—To a solution of acetic anhydride (48 ml.) and 70% perchloric acid (0.5 ml.) in ethyl acetate (400 ml.) add ethyl acetate to a total volume of 500 ml. then add dl-13-ethyl-17α-ethynyl-17β-hydroxygon - 4 - en - 3 - one (10.0 g.), swirl and let stand at room temperature for 5 minutes. Pour the reaction into saturated sodium bicarbonate solution. Separate the organic layer, wash with sodium bicarbonate, water, brine and dry over sodium sulfate. Filter, remove the solvent in vacuo then add methanol and pyridine (2 ml.) and boil for 10 minutes. Cool and remove the solvent in vacuo and crystallize the resulting oil from methanol. Filter to obtain 8.0 g. of title product, M.P. 162–164° C.

(b) dl-3-Cyclopentyloxy-13-ethyl - 17α - ethynylgona-3,5-dien-17β-ol, acetatae.—Reflux at about 85° C. a mixture of dl - 13-ethyl-17α-ethynylgona-3,5-dien-3,17β-diol, diacetate (1000 g.), p-toluenesulfonic acid (0.50 g.), cyclopentyl alcohol (20 ml.) and heptane (500 ml.) into a water-separator for 20 hours. Cool, add pyridine (3 ml.) then filter and evaporate the solvent in vacuo. Dissolve the resulting oil in methanol, filter and evaporate in vacuo then pump the residue dry. Crystallize the resulting oil from methanol to obtain 5.31 g. of title product, M.P. 148–150° C. Obtain an analytical sample by recrystallization from methanol, M.P. 154–155° C., $\lambda_{max.}^{EtOH}$ 243 mμ (ε 19,400)

Analysis.—Calcd. for $C_{28}H_{38}O_3$ (percent): requires C, 79.58; H, 9.06. Found (percent): C, 79.32; H, 8.77.

EXAMPLE 2 d-3-Clyclopentyloxy-13-ethyl-17α-ethynylgona-3,5-dien-17β-ol, acetate (a) d-13-ethyl-17α-ethynylgona - 3,5 - dien-3,17β-diol, diacetate.—To a solution of acetic anhydride (65 ml.) and 70% perchloric acid (1 ml.) in ethyl acetate (800 ml.) add d-13-ethyl-17α-ethynyl-17β-hydroxygon-4-en-3-one (10.0 g.) swirl and let stand at room temperature for 3.5 minutes. Pour the reaction into saturated sodium bicarbonate solution. Separate the organic layer, wash with sodium bicarbonate, water, brine and dry over sodium sulfate. Filter, remove the solvent in vacuo then add methanol and pyridine (1 ml.) and boil for 10 minutes. Cool and remove the solvent in vacuo. Dissolve the residue in methylene chloride, treat with Nuchar charcoal, filter and remove the solvent in vacuo. Dissolve the residue in hot methanol and let stand to crystallize. Filter to obtain 7.30 g. of the pure title product, M.P. 158–161° C.; [α]$_D$=194° (c.=1%, dioxane), $\lambda_{max.}^{KBr}$ 3.08 and 5.75μ. $\lambda_{max.}^{EtOH}$ 234 mμ, (ε 18,900)

Analysis.—Calcd. for $C_{25}H_{32}O_4$ (percent): C, 75.72; H, 8.13. Found (percent): C, 75.66; H, 7.90.

(b) d-3-cyclopentyloxy-13-ethyl-17α-ethynylgona-3,5-dien-17β-ol, acetate.—Reflux a mixture of d-13-ethyl-17α-ethynylgona-3,5-dien-3,17β-diol, diacetate (7.00 g.) p-toluenesulfonic acid (0.05 g.), cyclopentyl alcohol (30 ml.) and heptane (400 ml.) into a water separator for 20 hours. Cool, add pyridine (3 ml.) and evaporate the solvent in vacuo. Dissolve the resulting oil in methanol, filter and evaporate in vacuo then pump the residue dry. Crystallize the residue from methanol to get 1.83 g., M.P. 118–122° C. Treat the solid in hot ether with Nuchar charcoal, filter and remove the solvent in vacuo. Boil the residue with methanol and let stand to fully crystallize. Filter to get 1.50 g. of pure title product, M.P. 140–142-C.;

$\lambda_{max.}^{KBr}$ 3.06 and 5.75μ. $\lambda_{max.}^{EtOH}$ 243 mμ (ε 20,500)

[α]$_D$=214° (c.=1.1%, dioxane).

Analysis.—Calcd. for $C_{28}H_{38}O_3$ (percent): C, 79.58; H, 9.06. Found (percent): C, 79.28; H, 8.89.

EXAMPLE 3 dl-3-cyclopentyloxy-13-ethyl-17α-ethynylgona-3,5-dien-17β-ol (a) dl-13-ethyl-3-hydroxygona-3,5-dien-17-one, acetate.—To a solution of acetic anhydride (25 ml.) and 70% perchloric acid (0.3 ml.) in ethyl acetate (250 ml.) add dl-13-ethylgon-4-ene-3,17-dione (5.0 g., British Pat. No. 1,010,054, Example 3), swirl and let stand at room temperature for 3 minutes. Quench the reaction with saturated sodium bicarbonate solution then wash and dry the organic layer. Remove the solvent, in vacuo, add methanol and pyridine (½ ml.) to the residue then boil for 10 minutes on the steam bath. Cool, remove the solvents in vacuo and pump the residue to dryness. Triturate the residue with hexane and filter to obtain 4.54 g. of crude product. Treat the solid in methylene chloride with decolorizing charcoal, filter and remove the methylene chloride in vacuo. Crystallize the resulting oil from absolute ethanol to obtain 2.80 g. of pure title product, M.P. 145–148° C.;

$\lambda_{max.}^{KBr}$ 5.67 and 5.75μ

Analysis.—Calcd. for $C_{21}H_{28}O_3$ (percent): C, 76.79; H, 8.59. Found (percent): C, 76.64; H, 8.71.

(b) dl-3-cyclopentyloxy-13-ethylgona-3,5-dien-17-one.—Reflux a mixture of cyclopentanol (25 ml.), p-toluenesulfonic acid (250 mg.), and heptane (250 ml.) into a water separator for 1 hour then add dl-13-ethyl-3-hydroxygona-3,5-dien-17-one, acetate (3.00 g.) and continue refluxing into the water separator for 16 hours. Replace the water-separator with a fresh one containing pellets of sodium hydroxide and reflux for 7 hours. Again replace the water separator with a fresh one and reflux a further 16 hours. Cool, add pyridine (3 ml.), filter and evaporate the solvent in vacuo. Pump the residue dry, triturate with cold methanol and filter to obtain 2.60 g. of crude product. Dissolve the solid in ether-tetrahydrofuran (THF) containing several drops of pyridine, treat with decolorizing charcoal and filter. Remove the solvent in vacuo and crystallize the residue from methanol. Filter then dissolve the solid in a large volume of hot methanol, filter and let stand to deposit 1.26 g. of title product, M.P. 141–143° C. Finally, dissolve the solid in ether, add hexane and boil to remove the ether. Let stand to deposit 0.69 g. of pure title product as flat white prisms, M.P. 141—143° C.;

$\lambda_{max.}^{KBr}$ 5.77μ, $\lambda_{max.}^{EtOH}$ 243 mμ (ε 20,200)

Analysis.—Calcd. for $C_{24}H_{34}O_2$ (percent): C, 81.31; H, 9.67. Found (percent): C, 81.47; H, 9.40.

(c) dl-3-cyclopentyloxy-13-ethyl-17α-ethynylgona-3,5-dien-17β-ol.—Bubble purified acetylene gas through a solution of dl-3-cyclopentyloxy-13-ethylgona-3,5-dien-17-one (2.00 g.) in dry dimethylsulfoxide (DMSO), (150 ml.) for 45 minutes then add lithium acetylide-ethylene diamine (1.00 g.) and stir under an atmosphere of acetylene for 2 hours at room temperature. Again add lithium acetylide-ethylenediamine (1.00 g.), stir for 2 hours, then pour the reaction into ice-water. Extract the mixture with ether, wash, dry and evaporate the extract in vacuo. Dissolve the resulting oil in hexane and pass the solution through a short column of fluosilicate. Remove the hexane in vacuo, then dissolve the residue in ether and treat with decolorizing charcoal. Filter and remove the ether in vacuo and pump the residue under vacuum to complete dryness to get 1.00 g. of the title product;

$\lambda_{max.}^{KBr}$ 2.95 and 3.07μ

EXAMPLE 4

The following 17-hydroxygon-4-ene compounds:

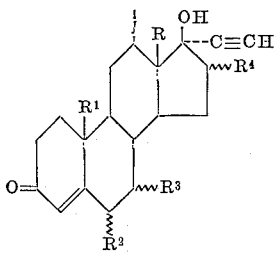

| R | R¹ | R² | R³ | R⁴ |
|---|---|---|---|---|
| CH₃CH₂CH₂ | H | H | H | H |
| (CH₃)₂CH | H | H | H | H |
| CH₃(CH₂)₁₈CH₂ | H | H | H | H |
| CH₃CH₂ | CH₃ | H | H | H |
| CH₃CH₂ | H | α-CH₃ | H | H |
| CH₃CH₂ | H | β-CH₃ | H | H |
| CH₃CH₂ | H | H | α-CH₃ | H |
| CH₃CH₂ | H | H | β-CH₃ | H |
| CH₃CH₂ | H | H | H | α-CH₃ |
| CH₃CH₂ | H | H | H | β-CH₃ | are treated with acetic anhydride and perchloric acid in ethyl acetate according to the procedure of Example 1, step (a) and the following 3-enol-acetate-17-acetates are obtained:

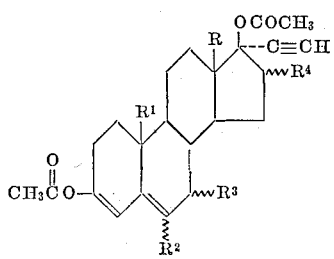

| R | R¹ | R² | R³ | R⁴ |
|---|---|---|---|---|
| CH₃CH₂CH₂ | H | H | H | H |
| (CH₃)₂CH | H | H | H | H |
| CH₃(CH₂)₁₈CH₂ | H | H | H | H |
| CH₃CH₂ | CH₃ | H | H | H |
| CH₃CH₂ | H | CH₃ | H | H |
| CH₃CH₂ | H | CH₃ | H | H |
| CH₃CH₂ | H | H | α-CH₃ | H |
| CH₃CH₂ | H | H | β-CH₃ | H |
| CH₃CH₂ | H | H | H | α-CH₃ |
| CH₃CH₂ | H | H | H | β-CH₃ |

These are treated with cyclopentyl alcohol and p-toluenesulfonic acid in refluxing heptane according to Example 1, step (b) and the following 3-cyclopentyloxy-13-alkyl-17α-ethynylgona-3,5-dien-17β-ol, acetates are obtained:

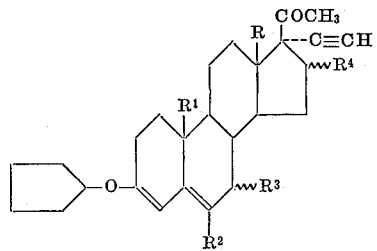

| R | R¹ | R² | R³ | R⁴ |
|---|---|---|---|---|
| CH₃CH₂CH₂ | H | H | H | H |
| (CH₃)₂CH | H | H | H | H |
| CH₃(CH₂)₁₈CH₂ | H | H | H | H |
| CH₃CH₂ | CH₃ | H | H | H |
| CH₃CH₂ | H | CH₃ | H | H |
| CH₃CH₂ | H | CH₃ | H | H |
| CH₃CH₂ | H | H | α-CH₃ | H |
| CH₃CH₂ | H | H | β-CH₃ | H |
| CH₃CH₂ | H | H | H | α-CH₃ |
| CH₃CH₂ | H | H | H | β-CH₃ |

EXAMPLE 5 dl-3-cyclopentyloxy-13-ethyl-17α-ethynylgona-3,5-dien-17β-ol, heptanoate (a) dl - 12-ethyl-17α-ethynylgona-3,5-diene-17β,diol 3-acetate, 17 - heptanoate.—Dissolve dl-13-ethyl-17α-ethynyl-17β-hydroxygon-4-en-3-one, heptanoate (8.7 g.) in ethyl acetate (800 ml.) which is 1 M in acetic anhydride and 10⁻³ M in perchloric acid. Allow to stand three minutes and wash with aqueous sodium bicarbonate. Remove the solvent in vacuo and triturate the residue with methanol to provide the title compound, 3.50 g. M.P. 105–108° C.

$\lambda_{max.}^{KBr}$ 3.10, 5.70, 5.75, 6.0, 6.12μ.

(b) dl-3-cyclopentyloxy-13-ethyl-17α-ethynylgona-3,5-dien-17β-ol, heptanoate.—Reflux p-toluene sulfonic acid monohydrate (0.04 g.) in heptane (50 ml.) and cyclopentanol (5.0 ml.) into a Dean-Stark water separator for one hour. Add dl-13-ethyl-17α-ethynylgona-3,5-dien-3,1β-diol-3-acetate-17heptanoate (1.0 g.) and reflux for 48 hours. Remove solvent and pump the residue at 10⁻¹ mm. Hg for 2 hours. Recrystallize from isopropanol-methanol to provide the product, 0.435 g., M.P. 113–114° C.

$\lambda_{max.}^{KBr}$ 3.11, 5.77, 6.09, 6.44μ

Analysis.—$C_{33}H_{48}O_3$ requires (percent): C, 80.44; H, 9.83. Found (percent): 80.34; H, 9.70.

EXAMPLE 6

The 17-hydroxygon-4-ene compounds used as starting materials in Example 4 are heated with appropriately substituted acid anhydrides and acyl halides and an acid acceptor according to the procedure of Example 5, step (a), then the enol esters are converted to the corresponding 3-cyclopentyl enol ethers by the procedure of Example 1(b) and in this manner the following compounds are obtained:

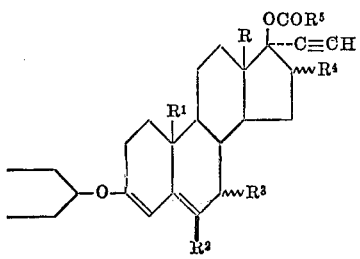

| R | R¹ | R² | R³ | R⁴ | R⁵ |
|---|---|---|---|---|---|
| CH₃CH₂ | H | H | H | H | CH₃ |
| CH₃CH₂ | H | H | H | H | CH₂(CH₂)₈CH₃ |
| CH₃CH₂ | H | H | H | H | —CHCH₂CH₂ |
| CH₃CH₂ | H | H | H | H | —CH)CH₂)₄CH₂ |
| CH₃CH₂ | H | H | H | H | —CH₂—⌬ |
| CH₃CH₂ | H | H | H | H | —CH₂CH₂—⌬ |
| CH₃CH₂ | H | H | H | H | —CH₂(CH₂)₂—⌬ |
| CH₃CH₂CH₂ | H | H | H | H | CH₃ |
| (CH₃)₂CH | H | H | H | H | CH₃ |
| CH₃(CH₂)₁₈CH₂ | H | H | H | H | CH₃ |
| CH₃CH₂ | CH₃ | H | H | H | CH₃ |
| CH₃CH₂ | H | CH₃ | H | H | CH₃ |
| CH₃CH₂ | H | CH₃ | H | H | CH₃ |
| CH₃CH₂ | H | H | α-CH₃ | H | CH₃ |
| CH₃CH₂ | H | H | β-CH₃ | H | CH₃ |
| CH₃CH₂ | H | H | H | α-CH₃ | CH₃ |
| CH₃CH₂ | H | H | H | β-CH₃ | CH₃ |

EXAMPLE 7

The procedure of Example 3 is repeated, substituting for the *dl*-13-ethylgona-4-ene-3,17-dione, stoichiometrical amounts of the following compounds:

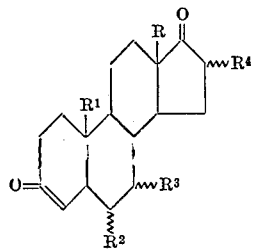

| R | R¹ | R² | R³ | R⁴ |
|---|---|---|---|---|
| CH₃CH₂CH₂ | H | H | H | H |
| (CH₃)₂CH | H | H | H | H |
| CH₃(CH₂)₁₈CH₂ | H | H | H | H |
| CH₃CH₂ | CH₃ | H | H | H |
| CH₃CH₂ | H | α-CH₃ | H | H |
| CH₃CH₂ | H | β-CH₃ | H | H |
| CH₃CH₂ | H | H | α-CH₃ | H |
| CH₃CH₂ | H | H | β-CH₃ | H |
| CH₃CH₂ | H | H | H | α-CH₃ |
| CH₃CH₂ | H | H | H | β-CH₃ | and the following 3-cyclopentyl enol ether-17β-ols are obtained:

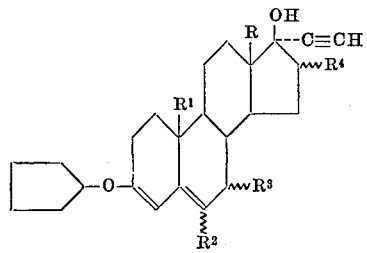

| R | R¹ | R² | R³ | R⁴ |
|---|---|---|---|---|
| CH₃CH₂CH₂ | H | H | H | H |
| (CH₃)₂CH | H | H | H | H |
| CH₃(CH₂)₁₈CH₂ | H | H | H | H |
| CH₃CH₂ | CH₃ | H | H | H |
| CH₃CH₂ | H | CH₃ | H | H |
| CH₃CH₂ | H | CH₃ | H | H |
| CH₃CH₂ | H | H | α-CH₃ | H |
| CH₃CH₂ | H | H | β-CH₃ | H |
| CH₃CH₂ | H | H | H | α-CH₃ |
| CH₃CH₂ | H | H | H | β-CH₃ |

EXAMPLE 8

The procedure of Example 1, step (a), is repeated, respectively at 15° C. and at 40° C. Substantially the same results are obtained.

The procedure of Example 1, step (a), is repeated, respectively, allowing a three minute and a 15 minute reaction time before pouring the mixture into sodium bicarbonate solution. Substantially the same results are obtained.

The procedure of Example 1, step (a), is repeated, substituting for ethyl acetate, equal weights, respectively, of the following (lower)alkyl (lower)alkanoates: methyl acetate, isopropyl acetate, n-hexyl acetate, ethyl propionate and n-hexyl n-hexanoate. Substantially the same results are obtained.

The procedure of Example 1, step (b) is repeated, respectively at 65° C. and at 175° C. (in a pressure vessel). Substantially the same results are obtained.

The procedure of Example 1, step (b), is repeated, respectively, allowing a 5 hour and a 48 hour reaction time. Substantially the same results are obtained.

The procedure of Example 1, step (b), is repeated substituting for the p-toluenesulfonic acid, stoichiometrical amounts of benzenesulfonic acid, naphthalenesulfonic acid, anthraquinonesulfonic acid and stannic chloride, antimony pentachloride and pyridine hydrochloride. Substantially the same results are obtained.

The procedure of Example 1, steps (a) and (b) are repeated, substituting for the ethyl acetate and the heptane, respectively, equivalent amounts of the following substantially non-polar organic solvents: Cyclohexane, benzene, isooctane, tetrahydrofuran, dioxane, ethylene bromide, chloroform and tetrachloroethane. Substantially the same results are obtained.

We claim:
1. A compound of the formula:

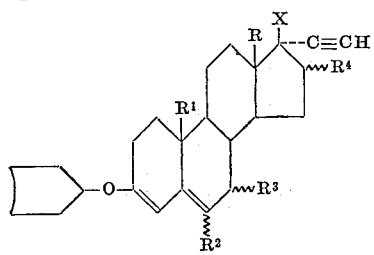

wherein
R is alkyl of from 2 to about 20 carbon atoms;
$R^1$, $R^2$, $R^3$ and $R^4$ are hydrogen or methyl; and
X is OH or $OCOR^5$ wherein $R^5$ is alkyl of from about 1 to about 10 carbon atoms, cycloalkyl of from about 3 to about 6 carbon atoms or monocarbocyclic aryl (lower)alkyl.

2. A compound as defined in claim 1 wherein R is ethyl, $R^1$, $R^2$, $R^3$ and $R^4$ are hydrogen and X is OH or $OCOCH_3$.

3. A compound as defined in claim 2 which is 3-cyclopentyloxy-13-ethyl-17α-ethynylgona - 3,5 - dien - 17β - ol, acetate.

4. A compound as defined in claim 3 in the form of a d-enantiomorph, substantially free of the corresponding l-enantiomorph.

5. A compound as defined in claim 2 which is 3-cyclopentyloxy-13-ethyl-17α-ethynylgona-3,5-dien-17β-ol.

6. A compound as defined in claim 1 which is 3-cyclopentyloxy-13-ethyl-17α-ethynylgona - 3,5 - dien - 17β - ol, heptanoate.

7. A process for the preparation of a 3-cyclopentyloxy-13-alkyl-17α-ethynylgona-3,5-dien-17β - ol, or 17 - acylate compound of the formula:

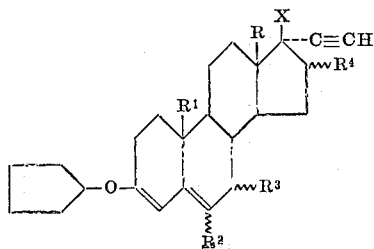

wherein
R is alkyl of from 2 to about 20 carbon atoms,
$R^1$, $R^2$, $R^3$ and $R^4$ are hydrogen or methyl; and
X is OH or $OCOR^5$ wherein $R^5$ is alkyl of from 1 to about 10 carbon atoms, cycloalkyl of from about 3 to about 6 carbon atoms or monocarbocyclic aryl (lower)alkyl which comprises:
(I) treating a 17-hydroxygon-4-ene compound of the formula:

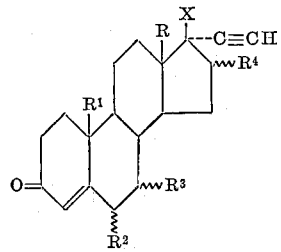

wherein R, $R^1$, $R^2$, $R^3$ and $R^4$ are as hereinabove defined, with either
(a) acetic anhydride and aqueous perchloric acid in a substantially non-polar, inert organic solvent until formation of a 3-enol acetate-17-acetate of the formula:

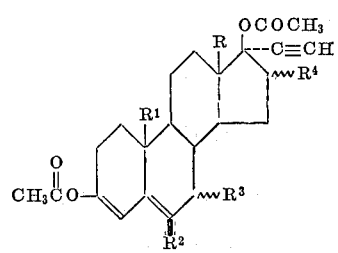

wherein R, $R^1$, $R^2$, $R^3$ and $R^4$ are as hereinabove defined, is substantially complete; or
(b) an anhydride of the formula

$(R^5CO)_2O$ wherein $R^5$ is as hereinabove defined in admixture with an acyl halide of the formula

$R^5CO—X'$ wherein $R^5$ is as hereinabove defined and X' is chloro or bromo and an acid acceptor at a temperature of from about 50° C. to about 150° C. until formation of a 3-enol acylate-17-acylate of the formula:

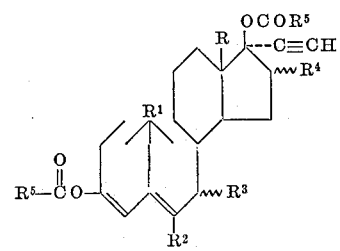

wherein R, $R^1$, $R^2$, $R^3$, $R^4$ and $R^5$ are as hereinabove defined, is substantially complete; and
(II) treating the products of either step I(a) or step I(b) with cyclopentyl alcohol in the presence of an acid catalyst until formation of the corresponding 3-cyclopentyloxy-13-alkyl-17α-ethynylgona - 3,5 - dien-17β-ol, 17-acylate, is substantially complete; or (III) treating a 3-cyclopentyloxy-13-alkylgona-3,5-diene-17-one compound of the formula

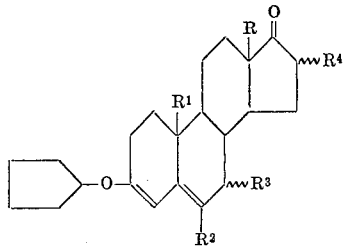

wherein R, $R^1$, $R^2$, $R^3$ and $R^4$ are as hereinabove defined, with an ethynylating agent until formation of the corresponding 3-cyclopentyloxy-13-alkyl-17α-ethynylgona-3,5-dien-17β-ol is substantially complete.

8. A process as defined in claim 7 wherein step I(a) is carried out at a temperature of from about 15° C. to about 40° C. for from about 3 to about 15 minutes.

9. A process as defined in claim 7 wherein step II is carried out at a temperature of from about 65° C. to about 175° C. for from about 5 to about 48 hours.

10. A process as defined in claim 7 wherein said substantially non-polar, inert organic solvent is (lower)alkyl (lower)alkanoate.

11. A process as defined in claim 7 wherein said acid catalyst is p-toluenesulfonic acid.

12. A process as defined in claim 7 wherein step III is carried out with acetylene and lithium acetylide-ethylene diamine in dimethyl sulfoxide.

13. A process as defined in claim 7 wherein R is ethyl, $R^1$, $R^2$, $R^3$ and $R^4$ are hydrogen and X is OH or $OCOR^5$ wherein $R^5$ is $CH_3$ or $CH_2(CH_2)_4CH_3$.

References Cited

UNITED STATES PATENTS

| | | | |
|---|---|---|---|
| 3,019,241 | 1/1962 | Ercoli | 260—397.4 |
| 3,053,735 | 9/1962 | Ercoli | 167—55 |
| 3,423,433 | 1/1969 | Westerhof et al. | 260—397.3 |
| 3,471,531 | 10/1969 | Hughes et al. | 260—397.5 |

HENRY A. FRENCH, Primary Examiner

U.S. Cl. X.R.

260—239.55 C, 397.4; 424—238